United States Patent [19]
Chambers et al.

[11] Patent Number: 6,047,365
[45] Date of Patent: Apr. 4, 2000

[54] MULTIPLE ENTRY WAVETABLE ADDRESS CACHE TO REDUCE ACCESSES OVER A PCI BUS

[75] Inventors: Peter Chambers; Scott Edward Harrow, both of Scottsdale, Ariz.

[73] Assignee: VLSI Technology, Inc., San Jose, Calif.

[21] Appl. No.: 08/754,961

[22] Filed: Nov. 22, 1996

Related U.S. Application Data

[63] Continuation-in-part of application No. 08/717,529, Sep. 17, 1996.
[51] Int. Cl.$^7$ .............................. G06F 12/00; G06F 12/02; G06F 12/10
[52] U.S. Cl. .......................... 711/220; 710/126; 711/154; 711/200; 711/206; 711/207; 711/221
[58] Field of Search ..................................... 711/206, 207, 711/220, 221, 3, 118, 137, 154, 200, 203, 208, 126, 130

[56] References Cited

U.S. PATENT DOCUMENTS

| | | | |
|---|---|---|---|
| 4,914,577 | 4/1990 | Stewart et al. | 711/207 |
| 4,972,338 | 11/1990 | Crawford et al. | 711/206 |
| 5,321,836 | 6/1994 | Crawford et al. | 711/206 |
| 5,584,005 | 12/1996 | Miyaoku et al. | 711/206 |
| 5,640,528 | 6/1997 | Harney et al. | 711/206 |
| 5,696,927 | 12/1997 | MacDonald et al. | 711/207 |
| 5,706,461 | 1/1998 | Branstad et al. | 711/203 |
| 5,763,801 | 6/1998 | Gulick | 84/604 |

OTHER PUBLICATIONS

Handy, Jim, "The Cache Memory Book", Academic Press, ISBN 0–12–322985–5, p. 15, 1993.

PCI Special Interest Group, "PCI Local Bus Specification, Revision 2.1", Portland Oregon 97214, Jun. 1, 1995.

*Primary Examiner*—Tuan V. Thai
*Attorney, Agent, or Firm*—Wagner, Murabito & Hao LLP

[57] ABSTRACT

A method and apparatus for optimizing sample fetching in a peripheral component interconnect (PCI) environment. In one embodiment the present invention generates a first sample page base address corresponding to a first part of a first address received from a digital signal processor (DSP). The present invention also generates a second sample page base address corresponding to a first part of a second address received from the DSP. The first and second generated sample page base addresses are then stored in respective first and second locations within a multiple entry sample page base address cache which can be accessed by the DSP without accessing a PCI bus. The first part of the first address is compared to a first part of a third address. Provided that the first part of the first address and the first part of the third address are the same, the present invention combines a second portion of the third address sent from the DSP with the first generated sample page base address stored in the multiple entry sample page base address cache. The first part of the second address is also compared with the first part of the third address. Provided that the first part of the second address and the first part of the third address are the same, the present invention combines the second portion of the third address sent from the DSP with the second generated sample page base address stored in the multiple entry sample page base address cache. In so doing, the present invention generates a complete address of a sample to be fetched without accessing the PCI bus.

15 Claims, 6 Drawing Sheets

MULTIPLE ENTRY WAVETABLE ADDRESS CACHE TO REDUCE ACCESSES OVER A PCI BUS

This Application is a Continuation-in-Part of Ser. No. 08/717,529 commonly-owned, copending, U.S. Patent Application entitled "Wavetable Address Cache", filed Sep. 17, 1996.

TECHNICAL FIELD

The present claimed invention relates to the field of sample fetching. More specifically, the present claimed invention relates to fetching multiple wavetable samples in a peripheral component interconnect (PCI) environment.

BACKGROUND ART

Wavetable audio is a widely used and well known technique in the audio processing art for generating or recreating audio sounds. In the past, an audio processing component such as, for example, an audio card would have dedicated read only memory (ROM) associated therewith. Audio samples referred to as "wavetable samples" would be stored in the dedicated ROM. In order to recreate a particular sound (typically referred to as a "voice"), the audio card fetched the desired wavetable samples from the dedicated ROM, processed the sample, and created the desired voice. Commonly, numerous samples have to be fetched and processed in order to create a desired voice. Although dedicated ROM facilitates the rapid acquisition of numerous wavetable samples, permanently dedicating a specific portion of memory to a particular application is not always a cost effective or desired implementation.

Some prior art approaches to wavetable audio now store the wavetable samples in system memory, for example, dynamic random access memory (DRAM). By storing the wavetable samples in system DRAM, the need to have a permanently dedicated memory space allocated for audio processing purposes is eliminated. That is, a particular memory space can be allocated storing wavetable samples at one time, and can then be used for another purpose at a different time. Also, by storing the wavetable samples in system memory, more space is available to store the samples. The use of system memory for storing wavetable samples is not without complications, however. In order to access wavetable samples stored in system memory, the digital signal processor of the audio card must access a PCI bus.

Figure 1A:
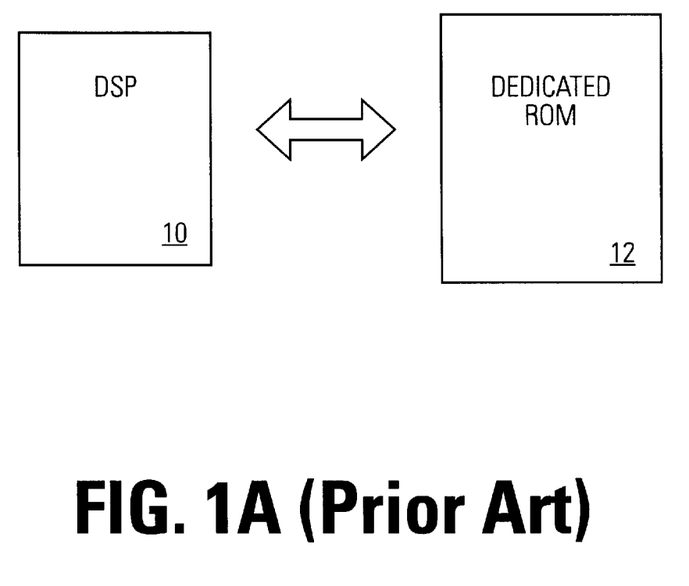
FIG. 1A is a schematic diagram of a conventional wavetable sample storing configuration in which a DSP has dedicated memory allotted thereto.
Figure 1B:
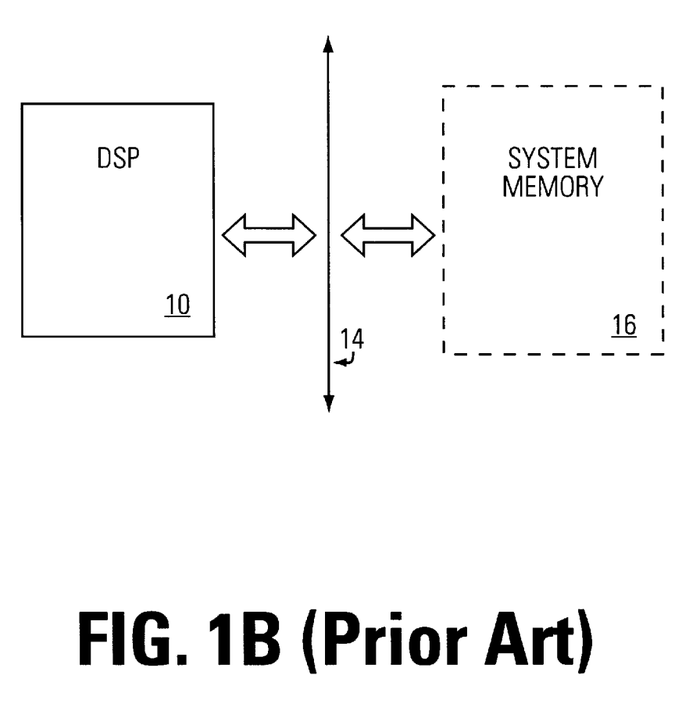
FIG. 1B is a schematic diagram of a conventional wavetable sample storing configuration in which a DSP must access a PCI bus before accessing wavetable samples stored in system memory.

As shown in Prior Art FIG. 1A, when dedicated ROM is used to store the wavetable samples, the DSP 10 directly accesses the dedicated ROM 12. On the other hand, as shown in Prior Art FIG. 1B, DSP 10 must first access a PCI bus 14 before accessing wavetable samples stored in system memory 16. Thus, in such an instance, the DSP must request access to the PCI bus, receive a grant to the PCI bus, and traverse the PCI bus in order to fetch a wavetable sample from system memory. Such required actions prolong the sample fetching time, thus increasing audio processing latency. As a result, the quality of generated audio voices can suffer.

Figure 1C:
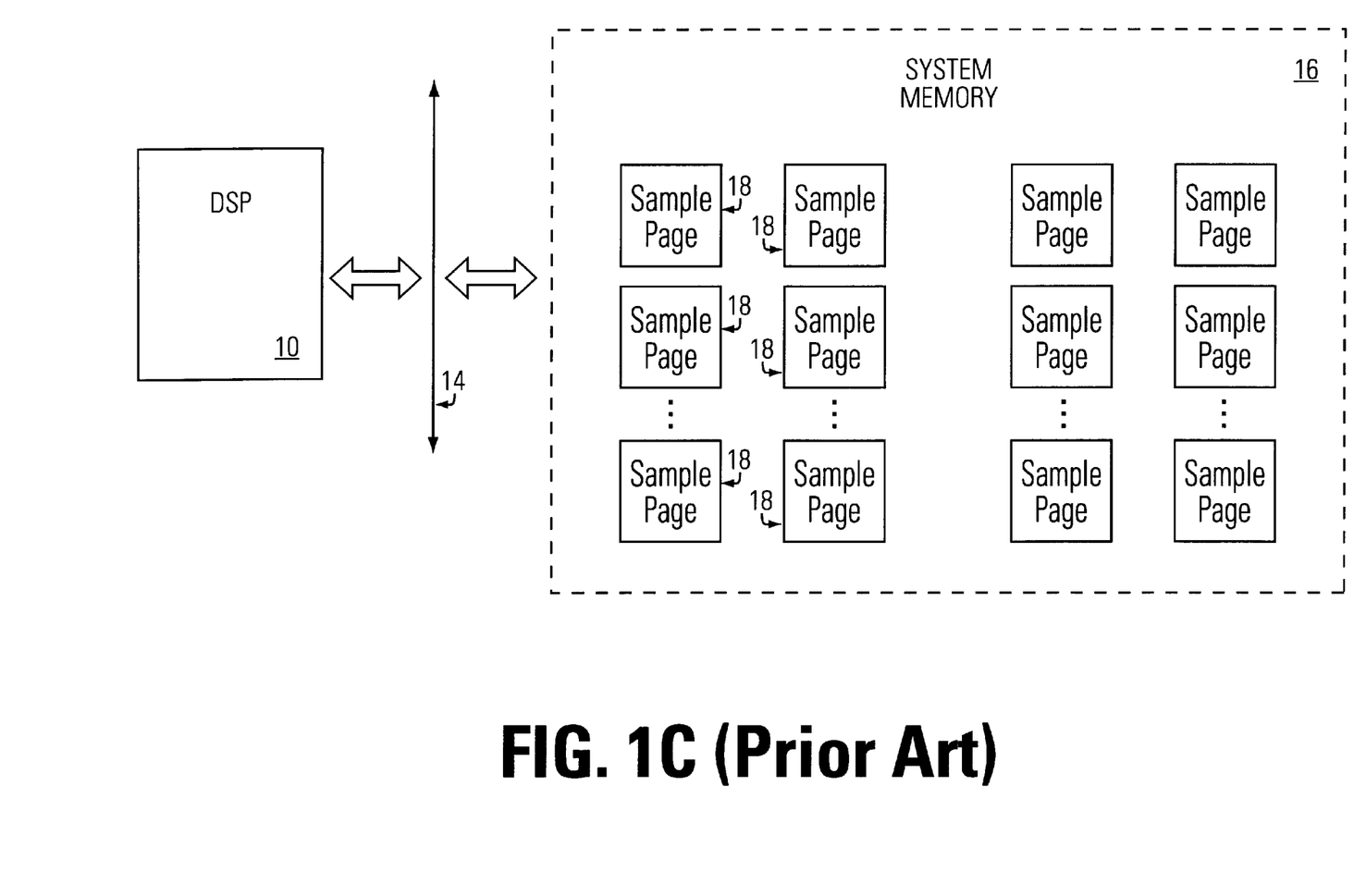
FIG. 1C is a schematic diagram of the conventional wavetable sample storing configuration of Prior Art FIG. 1B in which numerous discontiguous wavetable sample pages are stored in system memory.

Additionally, wavetable samples stored in system memory are typically stored in a discontiguous manner. That is, in dedicated ROM applications, for example, an entire megabyte of wavetable samples is stored in a single contiguous block of memory space. In system memory applications, however, wavetable samples are typically stored in numerous discontiguous blocks of memory space. The numerous discontiguous blocks of memory space are referred to as "sample pages". With reference now to Prior Art FIG. 1C, a schematic diagram showing numerous wavetable sample pages, typically shown as 18, is given. By storing the numerous wavetable sample pages in separate discontiguous blocks of memory space, the sample pages can be stored in various locations within the system memory. In so doing, the need to allocate or reserve a single large contiguous block of system memory solely for wavetable samples is eliminated. Hence, effective use of the system memory is achieved.

Although, storing wavetable samples in various discontiguous locations permits effective use of system memory, such an approach necessitates an intricate addressing scheme. Referring now to Prior Art FIG. 2, a schematic diagram of a conventional architecture employed to fetch wavetable samples from system memory is shown. In the prior art architecture of Prior Art FIG. 2, a DSP 10, of Prior Art FIGS. 1A–1C, generates an address 200 corresponding to a respective wavetable sample. A sample page base address table (SPBAT) base address register 202 is disposed to receive part of address 200. An adder 204 then combines a SPBAT base address with the received part of address 200. The combined address points to a particular location in a SPBAT 206 residing in system memory. SPBAT 206, in turn provides a sample page base address. The sample page base address points to the base of a particular wavetable sample page, typically shown as 208, residing in system memory. Thus, DSP 10 must access a PCI bus 14, of Prior Art FIGS. 1B and 1C, in order to fetch the base address of a given sample page. Hence, prior art schemes require "one trip" across PCI bus 14 simply to fetch the base address of a sample page.

Figure 2:
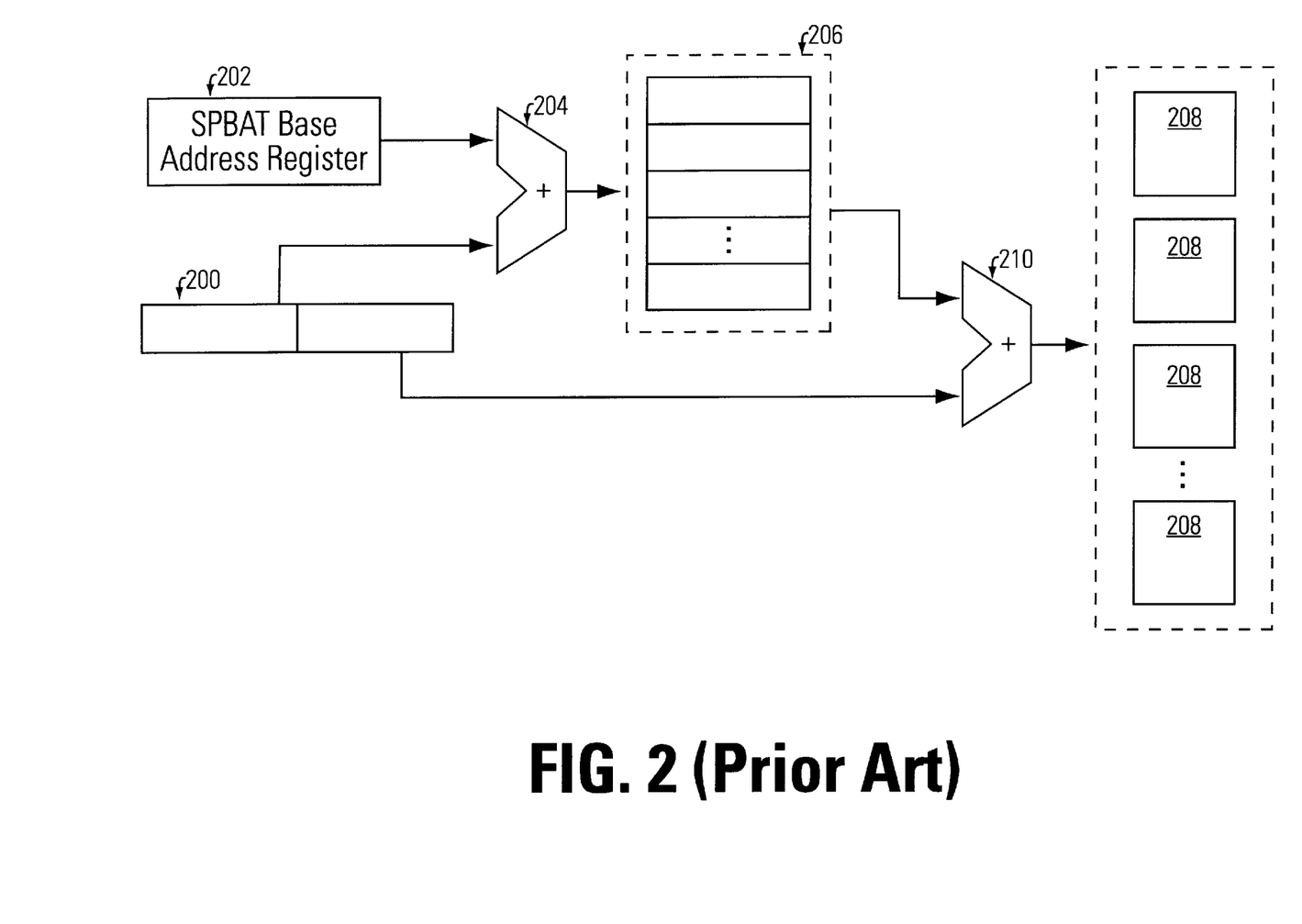
FIG. 2 is a schematic diagram of a conventional architecture employed to fetch wavetable samples from system memory.

Referring still to Prior Art FIG. 2, after the sample page base address has been fetched, another adder 210 combines the sample page base address with a sample page offset address. The sample page offset address comprises another portion of address 200 generated by DSP 10 of Prior Art FIGS. 1A–1C. The combined sample page base address and sample page offset address point to a particular entry in one of the wavetable sample pages, typically shown as 208. Thus, DSP 10 is then able to fetch a particular entry from the collection of wavetable sample pages 208. As mentioned above, wavetable sample pages 208 reside in system memory. Thus, after generating the complete wavetable sample page entry address, DSP 10 must make yet another trip across PCI bus 14 of Prior Art FIGS. 1B and 1C in order to fetch a respective wavetable sample page entry. Therefore, prior art sample fetching schemes require a first trip across a PCI bus to fetch a sample page base address, and then a second trip across the PCI bus to fetch a desired wavetable sample page entry. Hence, prior art sample fetching methods require at least two trips across a PCI bus. As mentioned above, each of the trips across the PCI bus requires the DSP to request access to the PCI bus, receive a grant to the PCI bus, and then traverse the PCI bus. Furthermore, if the grant to the PCI bus is lost, interrupted, or otherwise deasserted before the DSP has successfully fetched either the sample page base address or the wavetable sample page entry, the DSP must again regain access to the PCI bus. As a result, it is possible in prior art sample fetching schemes, that more than two trips across the PCI bus will be required to fetch a single wavetable sample page entry.

Additionally, it will be understood by those of ordinary skill in the art that a DSP will typically desire to consecutively fetch several wavetable sample page entries. As a result, the sample fetching latency incurred by repeatedly accessing the PCI bus can become a performance limiting factor.

Several conventional DSPs have the capability to play several voices concurrently. For example, when playing back wavetable sampled music, a piano, a trumpet, a flute, and the like may all be played simultaneously. Thus, numerous samples must be fetched from numerous different wavetable sample pages. Moreover, the groups or sets of first common voices are alternately fetched with groups or sets of second common voices. That is, if the DSP desires to play a trumpet and a piano concurrently, the DSP commonly fetches several trumpet samples, then fetches several piano samples, then fetches several more trumpet samples, then fetches several more piano samples, and so on. Therefore, the type of voice or sample being fetched often changes in a multiple voice environment.

Thus, a need exists for an apparatus and method which expedites sample fetching from system memory when multiple voices are played concurrently. A further need exists for an apparatus and method which decreases the need to access a PCI bus when fetching samples from system memory in an environment in which multiple voices are played concurrently.

DISCLOSURE OF THE INVENTION

The present invention provides a method and apparatus which expedites sample fetching from system memory when multiple voices are played concurrently. The present invention also decreases the need to access a PCI bus when fetching samples from system memory in an environment in which multiple voices are played concurrently. The present invention accomplishes the above achievements with a method and apparatus which utilizes a localized multiple entry cache memory to store the most-recently used sample page base address.

Specifically, in one embodiment, In one embodiment the present invention generates a first sample page base address corresponding to a first part of a first address received from a digital signal processor (DSP). The present invention also generates a second sample page base address corresponding to a first part of a second address received from the DSP. The first and second generated sample page base addresses are then stored in respective first and second locations within a multiple entry sample page base address cache which can be accessed by the DSP without accessing a PCI bus. The first part of the first address is compared to a first part of a third address. Provided that the first part of the first address and the first part of the third address are the same, the present invention combines a second portion of the third address sent from the DSP with the first generated sample page base address stored in the multiple entry sample page base address cache. The first part of the second address is also compared with the first part of the third address. Provided that the first part of the second address and the first part of the third address are the same, the present invention combines the second portion of the third address sent from the DSP with the second generated sample page base address stored in the multiple entry sample page base address cache. In so doing, the present invention generates a complete address of a sample to be fetched without accessing the PCI bus.

The present invention also describes in detail the apparatus for performing the steps of the above described method.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 3:
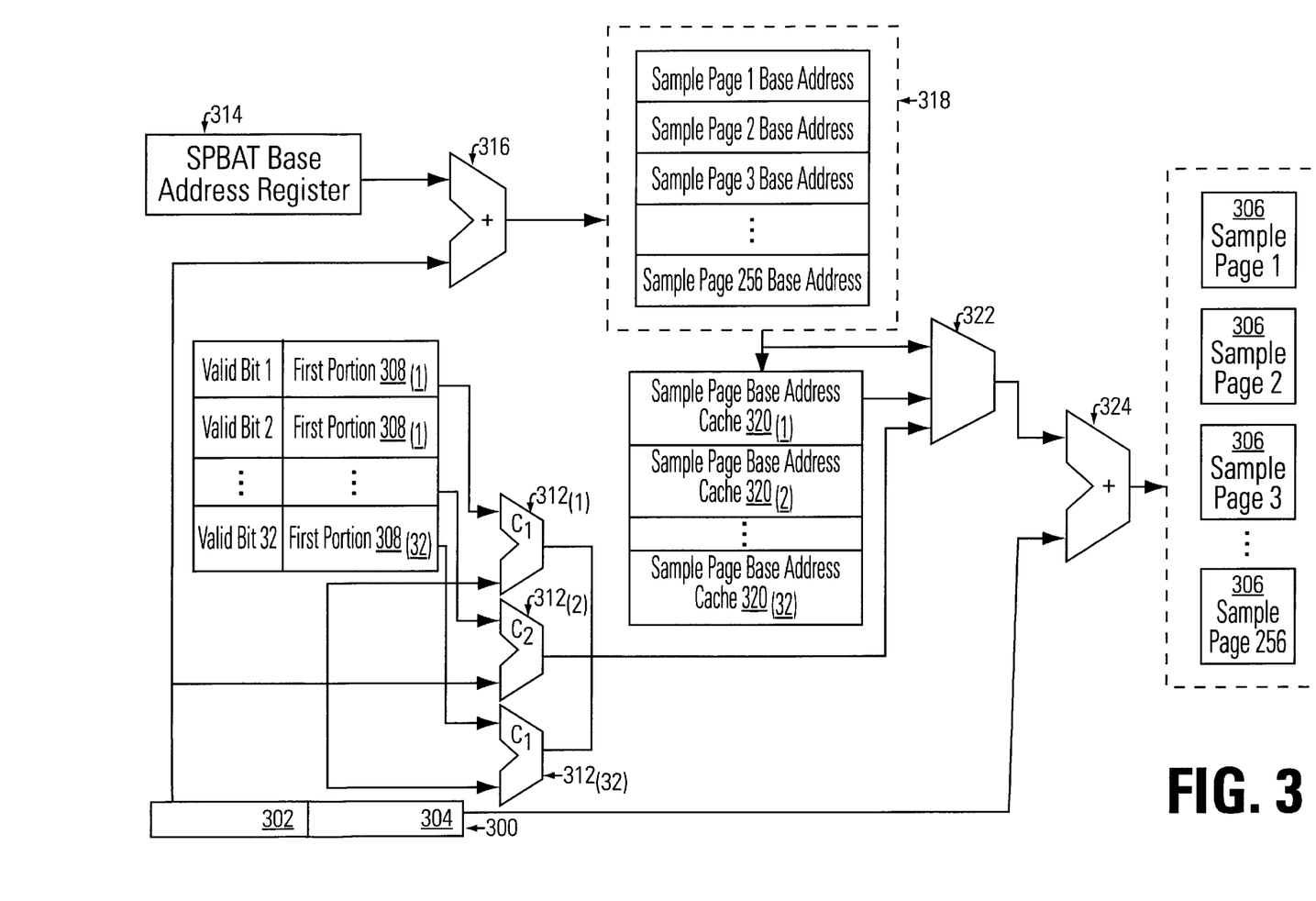
FIG. 3 is a schematic diagram of an architecture employed to expedite the fetching of wavetable samples from system memory in an environment in which multiple voices are played concurrently in accordance with one embodiment of the present claimed invention.

With reference now to FIG. 3, a schematic diagram of an architecture employed to expedite the fetching of wavetable samples from system memory in accordance with one embodiment of the present claimed invention is shown. The following description of the present invention will begin with a detailed description of the physical structure and architecture of the present invention. This description will then be followed by a detailed description setting forth the operation of the present invention. Regarding the structure and architecture of the present invention, a DSP, not shown, generates an address 300 corresponding to a particular wavetable sample page entry which the DSP desires to fetch. Address 300 of the present embodiment is a 20 bit address having an eight bit first portion 302, and a twelve bit second portion 304. Eight bit first portion 302 corresponds to a specific one of 256 wavetable sample pages, typically shown as 306. Twelve bit second portion 304 corresponds to a specific entry in a particular wavetable sample page. Each of the 256 wavetable sample pages 306 of the present embodiment is comprised of 4K bytes. Therefore, a 20 bit address 300 is used in the present embodiment to access the 1 megabyte of system memory occupied by the 256 wavetable sample pages. The present invention is also well suited to accommodating a larger or smaller address when a respectively larger or smaller amount of system memory space is occupied by the wavetable sample pages.

Referring still to FIG. 3, the present embodiment includes an address tag register array 308 comprised of multiple address tag registers $308_{(1)}$ through $308_{(32)}$. Address tag register array 308 is comprised of cache memory which can be accessed by the DSP without accessing a PCI bus. Although address tag register array 308 is comprised of 32 address tag registers in the present embodiment, the present invention is also well suited to having fewer or greater address tag registers in address tag register array 308. Each of address tag registers $308_{(1)}$ through $308_{(32)}$ is adapted to store a first portion of an address such as, for example, first portion 302 of address 300 therein. Hence, in the present embodiment, address tag register $308_{(1)}$ is an eight bit register for accommodating the eight bits of first portion 302 of address 300. The present invention is, however, well suited to having a larger or smaller address tag register when the first portion of the address generated by the DSP is accordingly larger or smaller than eight bits.

The present embodiment also includes a valid bit register array 310. In the present embodiment, valid bit register array is comprised of multiple valid bit registers $310_{(1)}$ through $310_{(32)}$. Valid bit register array 310 is comprised of cache memory which can be accessed by the DSP without accessing the PCI bus. Valid bit register array 310 has a valid bit register which corresponds to a respective address tag register of address tag register array 308. Thus, each address tag register has a valid bit register corresponding thereto which indicates whether the contents of the respective address tag register are valid. More specifically, in the present embodiment, each of valid bit registers $310_{(1)}$ through $310_{(32)}$ is adapted to store a single bit therein for indicating whether or not the contents of the corresponding address tag register are valid. Although valid bit register array 310 is comprised of 32 valid bit registers in the present embodiment, the present invention is also well suited to having fewer or greater valid bit registers in valid bit register array 310 depending upon the corresponding number of address tag registers in address tag register array 308.

As shown in FIG. 2, the present embodiment of the present invention also includes a plurality of comparators $312_{(1)}$ through $312_{(32)}$. In the present embodiment, each of comparators $312_{(1)}$ through $312_{(32)}$ has a first input, which is coupled to the output of an address tag register of address tag register array 308. Each of comparators $312_{(1)}$ through $312_{(32)}$ has a second input which is adapted to receive the first portion 302 of address 300 sent from a DSP, not shown. In the present embodiment, address tag register array 308 is configured in a fully set associative cache arrangement. Thus, it is necessary to compare the upper bits of the DSP address with every address tag in the cache of address tag register array 308. In the present embodiment, a content addressable memory (CAM) can be used to perform the comparison. Although such a cache configuration is used in the present embodiment, the present invention is also well suited to other cache configurations, such as for example, a direct mapped cache configuration. In a direct mapped cache configuration, the first portion of each address sent from the DSP will have only one possible storage location within address tag register array 308. As such, the first portion of an incoming address will only need to be compared with the contents of one location within address tag register array 308. Although such an embodiment simplifies and reduces the expense of the comparator design required in the present invention, the cache miss rate will be higher. Specifically, a matching entry may be displaced by a separate first portion of an address which maps to the same location within address tag register array 308 wherein the displacing entry does not match the first portion of the address being compared.

With reference still to FIG. 3, the present invention also includes a sample page base address table (SPBAT) base address register 314 coupled to an adder 316 which, in turn, is coupled to a sample page base address table (SPBAT) 318. In the present embodiment, SPBAT 318 contains 256 pointers to respective base addresses of particular wavetable sample pages 306. The present invention is also well suited to having SPBAT 318 contain various other numbers of pointers to fewer or greater base addresses of particular wavetable sample pages. SPBAT 318 resides in system memory. The present invention further includes a multiple entry sample page base address cache array 320 coupled to SPBAT 318. Multiple entry sample page base address cache array 320 is comprised of cache memory which can be accessed by the DSP without accessing a PCI bus. In the present embodiment, multiple entry sample page base address cache array 320 is comprised of 32 20 bit registers $320_{(1)}$ through $320_{(32)}$ adapted to store 32 sets of the 20 most significant bits of a plurality of 32 bit sample page base addresses passed to multiple entry sample page base address cache array 320 from SPBAT 318. Again, the present invention is also well suited to varying the size of multiple entry sample page base address cache 320 when less than or more than 20 bits are needed to address the base address of the wavetable sample pages residing in system memory. Similarly, the present invention is also well suited to varying the number of entries in multiple entry sample page base address cache array 320. That is, multiple entry sample page base address cache array 320 has an entry which corresponds to a respective address tag register of address tag register array 308. Thus, each valid address tag register has a sample page base address cache entry corresponding thereto. Thus, although multiple entry sample page base address cache array 320 is comprised of 32 sample page base address entries in the present embodiment, the present invention is also well suited to having fewer or greater sample page base address entries in multiple entry sample page base address cache array 320 depending upon the corresponding number of valid address tag registers in address tag register array 308.

The present embodiment also includes a multiplexor 322 adapted to receive inputs from comparator 312 and either SPBAT 318 or multiple entry sample page base address cache array 320. Multiplexor 322 is further adapted to output a value from either SPBAT 318 or multiple entry sample page base address cache array 320. The embodiment of FIG. 3 also includes an adder 324 coupled to the output of multiplexor 322 and adapted to receive, as an input, the second portion 304 of address 300.

Referring yet again to FIG. 3, in the present embodiment, only SPBAT 318 and wavetable sample pages 306 reside in system memory. That is, all other components reside locally with respect to the DSP. For example, in one embodiment, all of the components except SPBAT 318 and wavetable sample pages 306 reside on the same audio card as the DSP. In another embodiment, all components except SPBAT 318 and wavetable sample pages 306 reside on the same audio chip as the DSP. Hence, in the present embodiment, all of the components except SPBAT 318 and wavetable sample pages 306 can be accessed by the DSP without accessing a PCI bus. Additionally, although a DSP is said to fetch the wavetable sample page address and the particular wavetable sample page entry, it will be understood that in some applications, the DSP merely generates a 20 bit address such as address 300. In such applications, a state machine or other device performs the steps required to fetch the particular wavetable sample page entry, and then returns the fetched entry to the DSP. In such applications, the state machine or other fetching device is still delayed by PCI accessing requirements. Furthermore, although such a specific architecture is shown in the embodiment of FIG. 3, the present invention is also well suited to using various alternatives, modifications, and equivalents, which are included within the spirit and scope of the present claimed invention.

IN OPERATION

Figure 4A:
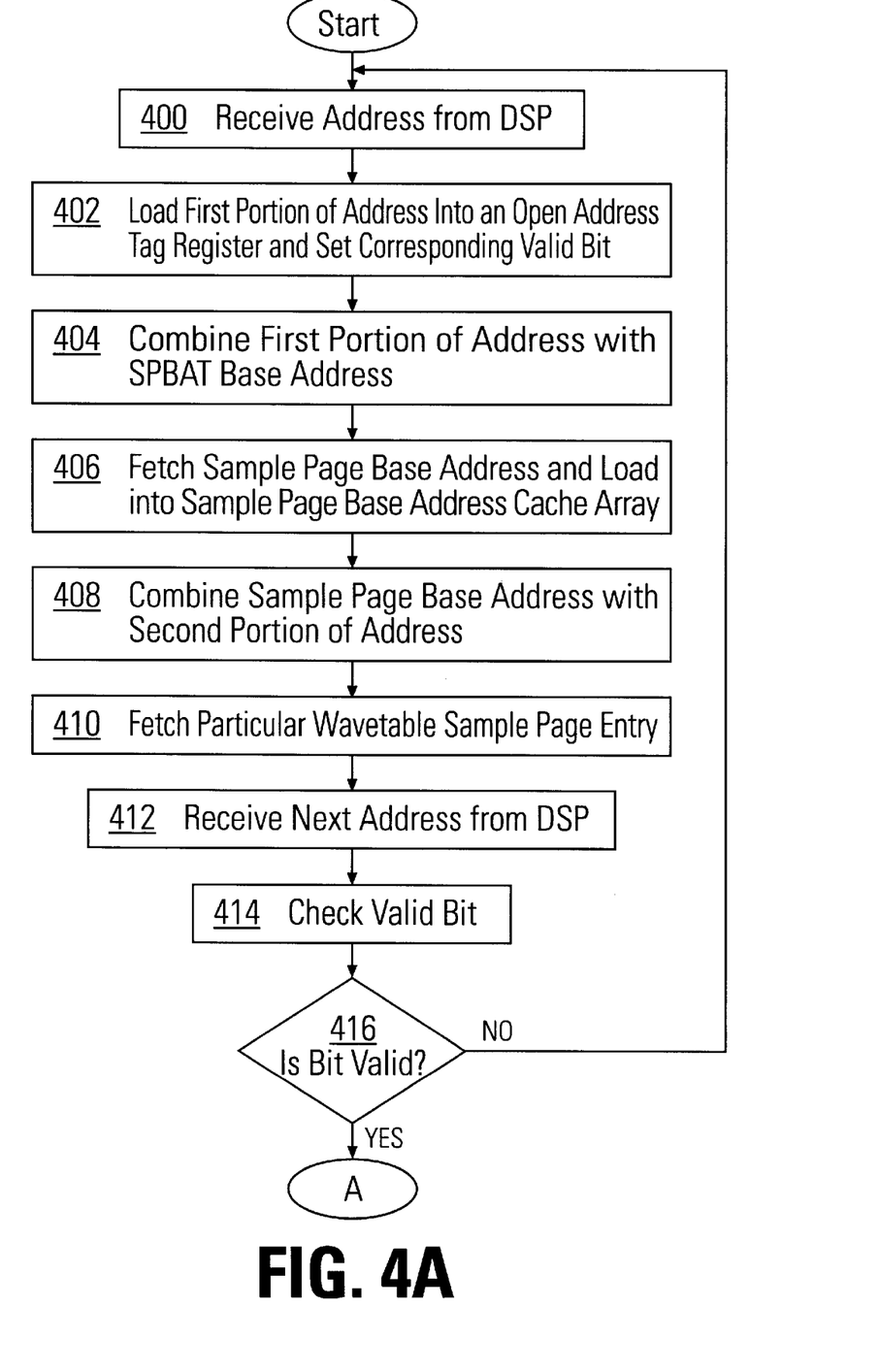
FIGS. 4A and 4B comprise a flow chart of steps performed in accordance with the present claimed invention.
Figure 4B:
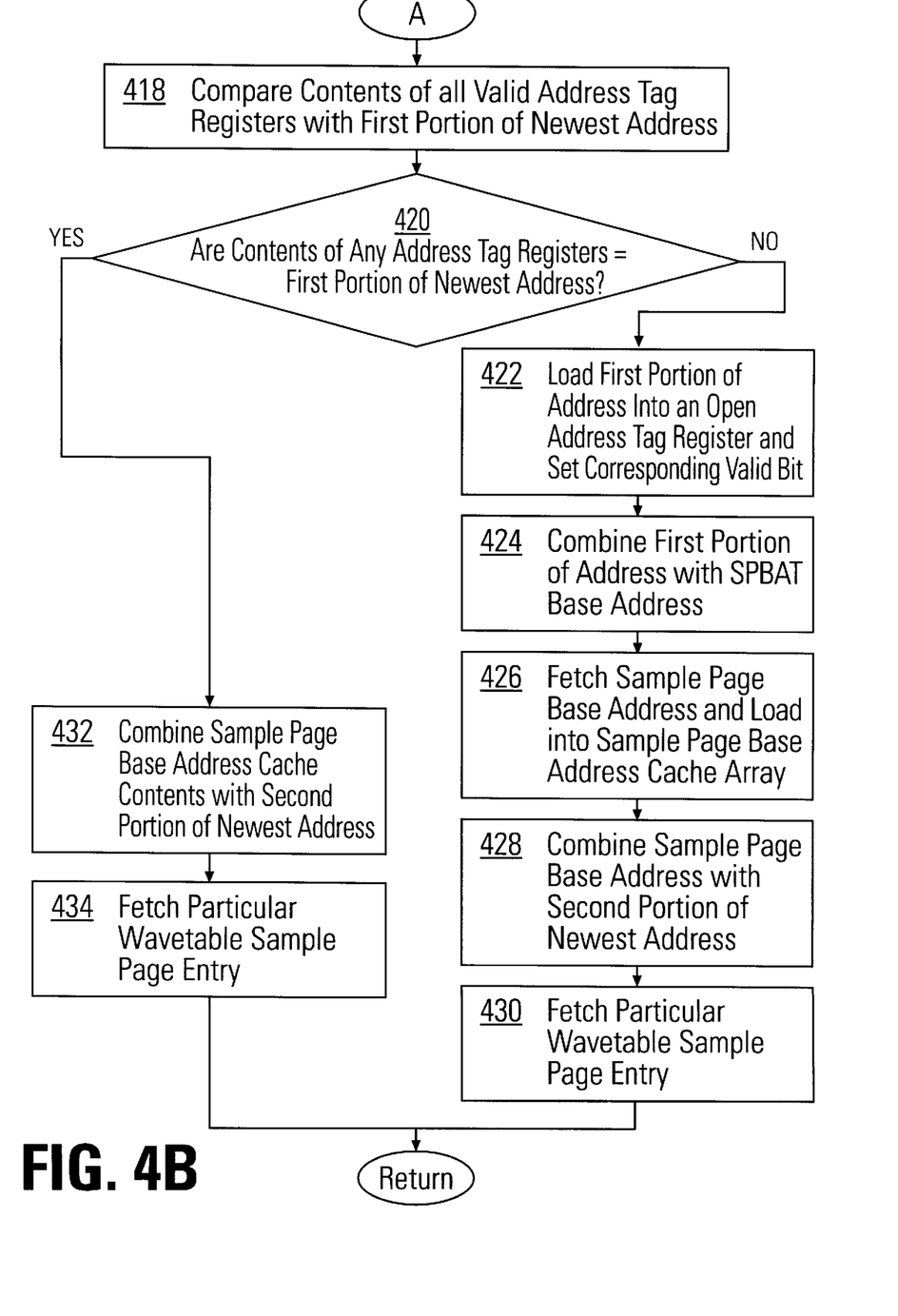

The following is a detailed description of the operation of the present invention. With reference now to FIGS. 4A and 4B, a flow chart of steps performed in accordance with the present claimed invention is shown. The steps of FIGS. 4A and 4B will be described in conjunction with the embodiment of FIG. 3. As shown in step 400, upon initial operation of the present invention, a first address 300 is generated by a DSP, not shown. The first eight bit portion 302 of address 300 is loaded into eight bit address tag register $308_{(1)}$ of address tag register array 308. Additionally, in step 402 the contents of corresponding valid bit register $310_{(1)}$ of valid bit register array 310 are set to indicate that the contents of address tag register $308_{(1)}$ are valid. Although first portion 302 of address 300 is stored in first entry $308_{(1)}$ in the present embodiment, the present invention is also well suited to storing first portion 302 in various other open locations within address tag register array 308. In such an embodiment, the valid bit corresponding to the address tag register in which first portion 302 is stored must be set to indicate that the contents of that address tag register are valid.

In step 404, adder 316 combines first portion 302 of first address 300 with a 32 bit address generated by SPBAT base address register 314. The combined address points to a specific location within SPBAT 318 which resides in system memory. As mentioned above, SPBAT 318 contains pointers to respective base addresses of particular wavetable sample pages 306.

At step 406, the present invention fetches a desired wavetable sample page base address from SPBAT 318 and loads the wavetable sample page base address into entry $320_{(1)}$ of multiple entry sample page base address cache array 320. More specifically, the particular wavetable sample page base address corresponding to the combined first portion 302 of first address 300 and the 32 bit address generated by SPBAT base address register 314 is loaded into entry $320_{(1)}$ of multiple entry sample page base address cache array 320. Thus, address tag register $308_{(1)}$ has its corresponding sample page base address stored in entry $320_{(1)}$ of multiple entry sample page base address cache array 320. Although address tag register $308_{(1)}$ has its corresponding sample page base address stored in entry $320_{(1)}$ in the present embodiment, the present invention is also well suited to storing the sample page base address corresponding to address tag register $308_{(1)}$ in various other locations within multiple entry sample page base address cache array 320. However, the present invention always correlates each address tag register to a particular entry within sample page base address cache array 320. In the present embodiment, only the 20 most significant bits of the wavetable sample page base address are loaded into entry $320_{(1)}$ of multiple entry sample page base address cache array 320. The present invention is also well suited to using 21 or a 22 bit registers in multiple entry sample page base address cache array 320 for 2 Mb and 4 Mb applications, respectively.

In step 408, the present invention combines the wavetable sample page base address with second portion 304 of first address 300. That is, multiplexor 322 outputs the 20 bit sample page base address to adder 324. 12 bit second portion 304 of first address 300 is also input to adder 324. Adder 324 combines the sample page base address with 12 bit second portion 304 to form a complete 32 bit wavetable sample page entry address.

As shown in step 410, the complete 32 bit address allows the DSP to fetch the desired wavetable sample page entry from system memory. Again, although a DSP is said to fetch the wavetable sample page address and the particular wavetable sample page entry, it will be understood that in some applications, the DSP merely generates a 20 bit address such as first address 300. In such applications, a state machine or other device performs the steps required to fetch the particular wavetable sample page entry, and then returns the fetched entry to the DSP.

At step 412, the DSP generates a second 20 bit address, hereinafter referred to as the second address. In the present embodiment, the second address, like previously received address 300, is comprised of an eight bit first portion, and 12 bit second portion.

Next, at step 414, the present invention checks the status of the contents of first valid bit register $310_{(1)}$ of valid bit register array 310. That is, the present invention checks the valid bit of the first address tag register in which the present invention desires to store the first portion of the newest address.

As shown in step 416, if the contents of first valid bit register $310_{(1)}$ indicate that the contents of first address tag register $308_{(1)}$ are not valid, then the present invention returns to step 402 and loads the first portion of the second address into the open address tag register $310_{(1)}$. The present invention then repeats steps 404 through 410 for the second address, in order to fetch the wavetable sample entry corresponding to the second received address. If the contents of valid bit register $310_{(1)}$ indicate that the contents of address tag register $308_{(1)}$ are valid, then the present invention proceeds to step 418.

Referring now to step 418, comparator 312 of the present invention compares the contents of all valid address tag registers with the first portion of the second address. If none of the valid address tag registers are the same as the first portion of the second address as inquired at step 420, the present invention proceeds to step 422.

At step 422, the present invention loads the first portion of the second address into open address tag register $308_{(2)}$ of address tag register array 308. Additionally, in step 422 the contents of valid bit register $310_{(2)}$ of valid bit array 310 are set to indicate that the contents of address tag register $308_{(2)}$ are valid. Thus, in the present embodiment, address tag register array 308 is loaded in chronological order starting at from entry $308_{(1)}$. The present invention is also well suited to loading address tag register array 308 in various other orders. As mentioned above, each address tag register has a valid bit register corresponding thereto. Thus, in the present embodiment, the valid bit register $310_{(2)}$ of valid bit register array 310 corresponds to entry $308_{(2)}$ of address tag register array 308.

In step 424, adder 316 combines the first portion of the second address with a 32 bit address generated by SPBAT base address register 314.

At step 426, the present invention fetches a wavetable sample page base address corresponding to the first portion of the newest address and loads the wavetable sample page base address into entry 320$_{(2)}$ of multiple entry sample page base address cache array 320. Thus, in the present embodiment, multiple entry sample page base address cache array 320 is loaded in chronological order starting at entry 320$_{(1)}$. The present invention is also well suited to loading multiple entry sample page base address cache array 320 in various other orders. As mentioned above, the present invention always correlates each address tag register to a particular entry within sample page base address cache array 320. Thus, in the present embodiment, the contents of entry 320$_{(2)}$ of multiple entry sample page base address cache array 320 correspond to address tag register 308$_{(2)}$ of address tag register array 308.

In step 428, the present invention combines the wavetable sample page base address with the second portion of the second address. That is, multiplexor 322 outputs the 20 bit sample page base address to adder 324. The 12 bit second portion of the second address is also input to adder 324. Adder 324 combines the sample page base address with the 12 bit second portion of the second address to form a complete 32 bit wavetable sample page entry address.

As shown in step 430, the complete 32 bit address allows the DSP to fetch the desired wavetable sample page entry from system memory. As mentioned above, in the present embodiment, multiple entry sample page base address cache array 320 is able to store 32 entries. Therefore, assuming that the first portion of each new address is not the same as the first portion of any of the previous 31 addresses, the present embodiment is able to cycle though steps 400 through 430 until all 32 entries of multiple entry sample page base address cache array 320 are filled. In so doing, 32 separate sample page base addresses will be stored in respective entries 320$_{(1)}$ through 320$_{(32)}$ of multiple entry sample page base address cache array 320. Also, 32 separate corresponding addresses will be stored in address tag registers 308$_{(1)}$ through 308$_{(32)}$. As mentioned above, the present invention is also well suited varying the number of entries contained in sample page base address cache array 320. More specifically, the present invention is well suited to setting the number of entries equal to the number of voices which are expected to be played simultaneously.

Additionally, if more than 32 non-identical first portions of addresses are received from the DSP, the present embodiment flushes the oldest entry from multiple entry sample page base address cache array 320 to make room for the most recent generated sample page base address. Similarly, the present embodiment flushes the oldest corresponding address from address tag register array 308. The present invention is also well suited to using various prioritizing methods to determine which address tag will be removed from multiple entry sample page base address cache array 320 in order to make room for the most recently received address.

The present invention also sets all valid bit registers invalid until a valid address is inserted into the corresponding address tag register.

If, in step 420, the contents of a valid address tag register and the first portion of the second address are the same, the present invention proceeds to step 432. Additionally, in the present embodiment, the comparison of step 418 is performed using a plurality of comparators 312$_{(1)}$ through 312$_{(32)}$. In the present embodiment, address tag register array 308 is configured in a fully set associative cache arrangement. Thus, it is necessary to compare the upper bits of the newest DSP address with every valid address tag in the cache of address tag register array 308. In the present embodiment, a content addressable memory (CAM) can be used to perform the comparison. Although such a cache configuration is used in the present embodiment, the present invention is also well suited to other cache configurations, such as for example, a direct mapped cache configuration. In a direct mapped cache configuration, the first portion of each address sent from the DSP will have only one possible storage location within address tag register array 308. As such, the first portion of an incoming address will only need to be compared with the contents of one location within address tag register array 308.

In step 432, the present invention combines the corresponding wavetable sample page base address stored in multiple entry sample page base address cache array 320 with the second portion of the second address. Thus, if the contents of valid first address tag register 308$_{(1)}$ are the same as the first portion of the second address, the second portion of the second address is combined with the stored sample page base address corresponding to address tag register 308$_{(1)}$. Similarly, if the first portion of a newly received address is the same as the contents stored in valid address tag register 308$_{(27)}$, the second portion of the newly received address is combined with the stored sample page base address corresponding to address tag register 308$_{(27)}$. In step 432 of the present embodiment, multiplexor 322 outputs the appropriate 20 bit sample page base address entry stored in multiple entry sample page base address cache array 320 to adder 324. The 12 bit second portion of the second address is also input to adder 324. Adder 324 combines the previously stored sample page base address with the 12 bit second portion of the second address to form a complete 32 bit wavetable sample page entry address. Thus, the present invention is able to generate a complete 32 bit wavetable sample page entry address without accessing system memory. Instead of accessing a SPBAT residing in system memory, the present invention uses the previously stored sample page base address entry stored in multiple entry sample page base address cache 320 which resides locally with respect to the DSP.

As shown in step 434, the complete 32 bit address allows the DSP to fetch the desired wavetable sample page entry from system memory.

In audio processing, numerous proximately stored wavetable samples are often fetched successively. Hence, numerous entries stored on the same wavetable sample page may be fetched successively. Therefore, the first portion of successive addresses sent from the DSP will often be identical. By storing the sample page base address in a locally disposed sample page base address cache, the present invention eliminates the need for the DSP to access the PCI bus to reach a SPBAT in system memory. Instead, the present invention compares the first portion of a second received address with the first portion of the most-recently used address. If the two address portions are the same, the present invention retrieves the sample page base address from a sample page base address cache instead of from system memory.

Furthermore, in a multiple voice environment, several voices are played concurrently. Thus, numerous samples must be fetched from numerous different wavetable sample pages. Moreover, the groups or sets of first common voices are alternately fetched with groups or sets of second common voices. The present invention allows several sets of frequently fetched sample page base addresses to be stored locally with respect to the DSP. Hence, the present invention locally stores the sample page base addresses of both the first set of common voices and the second set of common voices. In fact, in the present embodiment, as many as 32 frequently fetched sample page base addresses can be stored locally with respect to the DSP.

Thus, the present invention reduces latency and improves bandwidth. In fact, by eliminating one of the two PCI bus trips typically required to fetch a single wavetable sample entry, the present invention can reduce fetching latency by almost as much as 50 percent over prior art systems.

By reducing the required number of times the DSP needs to access the PCI bus, the present invention increases the number of voices which the DSP can fetch and process in a given time period. As a result, the present invention dramatically increases DSP sound performance. The present invention especially increases performance in a multiple voice environment where fetching requirements are particularly rigorous.

Thus, the present invention provides an apparatus and method which expedites sample fetching from system memory when multiple voices are played concurrently. The present invention further provides an apparatus and method which decreases the need to access a PCI bus when fetching samples from system memory in an environment in which multiple voices are played concurrently.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for optimizing sample fetching in a peripheral component interconnect (PCI) environment, said method comprising the steps of:

a) generating a first sample page base address corresponding to a first part of a first address received from a digital signal processor (DSP);

b) storing said generated first sample page base address in a first location within a multiple entry sample page base address cache which can be accessed by said DSP without accessing a PCI bus;

b1) storing said generated first sample page base address in said first location within a 20 bit multiple entry sample page base address cache which can be accessed by said DSP without accessing a PCI bus; and b2) storing said generated second sample page base address in said second location within said 20 bit multiple entry sample page base address cache which can be accessed by said DSP without accessing a PCI bus; and c) generating a second sample page base address corresponding to a first part of a second address received from said DSP;

d) storing said generated second sample page base address in a second location within said multiple entry sample page base address cache;

e) comparing said first part of said first address receiving from a first eight bit address tag register to a first part of a third address received from said DSP;

f) combining a second portion of said third address with said generated first sample page base address stored in said first location within said multiple entry sample page base address cache provided said first part of said first address and said first part of said third address are the same such that a complete address of a sample to be fetched is generated without accessing said PCI bus;

g) comparing said first part of said second address receiving from a second eight bit address tag register to said first part of said third address received from said DSP; and h) combining a second portion of said third address with said generated second sample page base address stored in said second location within said multiple entry sample page base address cache provided said first part of said second address and said first part of said third address are the same such that a complete address of a sample to be fetched is generated without accessing said PCI bus.

2. The method for optimizing sample fetching in a PCI environment as recited in claim 1 wherein step a) further comprises the steps of:

combining said first part of said first address with a sample page address table base address; and combining said first part of said second address with said sample page address table base address.

3. The method for optimizing sample fetching in a PCI environment as recited in claim 1 wherein step e) further comprises the steps of:

receiving at a first comparator said first portion of said first address, said first portion of said first address sent to said first comparator from said first eight bit address tag register;

receiving said first portion of said third address sent from said DSP at said first comparator; and using said first comparator to compare said first portion of said third address to said first portion of said first address, said first comparator disposed so as to receive said first portion of said first address from said first eight bit address tag register and said first portion of said third address from said DSP without accessing said PCI bus.

4. The method for optimizing sample fetching in a PCI environment as recited in claim 3 wherein step e) further comprises the step of:

checking a first valid bit register to determine whether said first eight bit address tag register contains valid information.

5. The method for optimizing sample fetching in a PCI environment as recited in claim 1 wherein step g) further comprises the steps of:

receiving at a second comparator said first portion of said second address, said first portion of said second address sent to said second comparator from said second eight bit address tag register;

receiving said first portion of said third address sent from said DSP at said second comparator; and using said second comparator to compare said first portion of said third address to said first portion of said second address, said second comparator disposed so as to receive said first portion of said second address from said second address tag register and said first portion of said third address from said DSP without accessing said PCI bus.

6. The method for optimizing sample fetching in a PCI environment as recited in claim 5 wherein step g) further comprises the step of:

checking a second valid bit register to determine whether said second eight bit address tag register contains valid information.

7. The method for optimizing sample fetching in a PCI environment as recited in claim 1 wherein step f) further comprises the step of:

combining a sample page offset address from said DSP with said generated first sample page base address stored in said first location within said multiple entry sample page base address cache provided said first part of said first address and said first part of said third address are the same such that a complete address of said sample to be fetched is generated without accessing said PCI bus.

8. The method for optimizing sample fetching in a PCI environment as recited in claim 1 wherein step h) further comprises the step of:

combining a sample page offset address from said DSP with said generated second sample page base address stored in said second location within said multiple entry sample page base address cache provided said first part of said second address and said first part of said third address are the same such that a complete address of said sample to be fetched is generated without accessing said PCI bus.

9. The method for optimizing sample fetching in a PCI environment as recited in claim 1 wherein step f) further comprises the steps of:

receiving at an adder said generated first sample page base address stored in said first location within said multiple entry sample page base address cache;

receiving at said adder said second portion of said third address sent from said DSP; and using said adder to combine said generated first sample page base address with said second portion of said third address provided said first portion of said first address and said first portion of said third address are the same such that said complete address of said sample to be fetched is generated without accessing said PCI bus.

10. The method for optimizing sample fetching in a PCI environment as recited in claim 1 wherein step h) further comprises the steps of:

receiving at an adder said generated second sample page base address stored in said second location within said multiple entry sample page base address cache;

receiving at said adder said second portion of said third address sent from said DSP; and using said adder to combine said generated second sample page base address with said second portion of said third address provided said first portion of said second address and said first portion of said third address are the same such that said complete address of said sample to be fetched is generated without accessing said PCI bus.

11. A wavetable address cache apparatus for reducing latency and optimizing bus bandwidth when fetching wavetable samples in a peripheral component interconnect (PCI) environment, said apparatus comprising:

a sample page base address table adapted to receive a first portion of a first address sent from a digital signal processor (DSP) and a first portion of a second address sent from said DSP, said sample page base address table adapted to generate a first sample page base address corresponding to said first portion of said first address, said sample page base address table further adapted to generate a second sample page base address corresponding to said first portion of said second address;

a multiple entry sample page base address cache coupled to said sample page base address table, said sample page base address cache adapted to store said first and second sample page base addresses in respective first and second locations within said multiple entry sample page base address cache, said multiple entry sample page base address cache disposed so as to be accessible by said DSP without accessing a PCI bus;

an address tag register array adapted to receive and store said first portion of said first address and said first portion of said second address, said address tag register disposed so as to receive said first portion of said first address and said first portion of said second address from said DSP without accessing said PCI bus;

a valid bit register array coupled to said address tag register array for indicating whether respective address tag registers of said address tag register array contain valid information;

a comparator coupled to said address tag register array, said comparator adapted to receive a first portion of a third address sent from said DSP and compare said first portion of said third address to said first portion of said first address received from said address tag register array, said comparator further adapted to compare said first portion of said third address to said first portion of said second address received from said address tag register array, said comparator disposed so as to receive said first portion of said first and second addresses from said address tag register array and said first portion of said third address without accessing said PCI bus; and an adder coupled to said comparator, said sample page base address table, and said multiple entry sample page base address cache, said adder adapted to receive a second portion of said third address from said DSP, said adder further adapted to combine said second portion of said third address with said first sample page base address stored in said first location within said multiple entry sample page base address cache provided said first portion of said first address and said first portion of said third address are the same, said adder further adapted to combine said second portion of said third address with said second sample page base address stored in said second location within said multiple entry sample page base address cache provided said first portion of said second address and said first portion off said third address are the same, said adder further adapted to combine said second portion of said third address with a third sample page base address generated by said sample page base address table wherein said third sample page base address corresponds to said first portion of said third address provided said first portion of said third address is not the same as either said first portion of said first address or said first portion of said second address;

wherein said multiple entry sample page base address cache is a twenty (20) bit address cache, and said address tag register is an eight (8) bit address tag register.

12. The wavetable address cache apparatus of claim 11 further comprising:

a sample page address table base address register coupled to said sample page base address table, said sample page address table base address register adapted to receive said first portion of said first address and said first portion of said second address from said DSP and point said first portion of said first address and said first portion of said second address to respective appropriate first and second locations within said sample page address table.

13. The wavetable address cache apparatus of claim 11 wherein said first portion of said first address corresponds to a first wavetable sample page, and said first portion of said second address corresponds to a second wavetable sample page.

14. The wavetable address cache apparatus of claim 13 wherein said second portion of said first address corresponds to a first entry in said first wavetable sample page, and said second portion of said second address corresponds to a second entry in said second wavetable sample page.

15. A method for efficiently fetching samples in a peripheral component interconnect (PCI) environment, said method comprising the steps of:

a) generating a first sample page base address corresponding to a first part of a first address received from a digital signal processor (DSP);

b) storing said first generated sample page base address in a 20 bit multiple entry sample page base address cache which can be accessed by said DSP without accessing a PCI bus;

c) generating a second sample page base address corresponding to a first part of a second address received from said DSP;

d) storing said second generated sample page base address in said 20 bit multiple entry sample page base address cache;

e) receiving at a first comparator said first portion of said first address, said first portion of said first address sent to said first comparator from a first eight bit address tag register;

f) checking a first valid bit register array to determine whether said first eight bit address tag register contains valid information;

g) receiving at said first comparator a first portion of a third address sent from said DSP;

h) using said first comparator to compare said first portion of said third address to said first portion of said first address, said first comparator disposed so as to receive said first portion of said first address from said first eight bit address tag register and said first portion of said third address from said DSP without accessing said PCI bus;

i) receiving at a second comparator said first portion of said second address, said first portion of said second address sent to said second comparator from a second eight bit address tag register;

j) checking a second valid bit register array to determine whether said second eight bit address tag register contains valid information;

k) receiving at said second comparator said first portion of said third address sent from said DSP;

l) using said second comparator to compare said first portion of said third address to said first portion of said second address, said second comparator disposed so as to receive said first portion of said second address from said second eight bit address tag register and said first portion of said third address from said DSP without accessing said PCI bus;

m) using an adder to combine said first generated sample page base address with a sample page offset address sent from said DSP provided said first portion of said first address and said first portion of said third address are the same such that a complete address of a sample to be fetched is generated without accessing said PCI bus, said adder further adapted to combine said second generated sample page base address with a sample page offset address sent from said DSP provided said first portion of said second address and said first portion of said third address are the same such that a complete address of a sample to be fetched is generated without accessing said PCI bus.

* * * * *